(12) United States Patent
Sugiura

(10) Patent No.: US 12,518,200 B2
(45) Date of Patent: Jan. 6, 2026

(54) METHOD FOR LABELING DATA SET OF SUPERVISED LEARNING MACHINE, SUPERVISED LEARNING MACHINE, AND STATE ESTIMATION APPARATUS

(71) Applicant: OKUMA CORPORATION, Niwa-Gun (JP)

(72) Inventor: Hiraku Sugiura, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 1033 days.

(21) Appl. No.: 17/455,958

(22) Filed: Nov. 22, 2021

(65) Prior Publication Data

US 2022/0164704 A1 May 26, 2022

(30) Foreign Application Priority Data

Nov. 25, 2020 (JP) .................................. 2020-195446
Nov. 19, 2021 (JP) .................................. 2021-188853

(51) Int. Cl.
*G06N 20/00* (2019.01)
*G06F 18/214* (2023.01)
*G06F 18/2323* (2023.01)
*G06F 18/2413* (2023.01)

(52) U.S. Cl.
CPC ........... *G06N 20/00* (2019.01); *G06F 18/214* (2023.01); *G06F 18/2323* (2023.01); *G06F 18/2414* (2023.01)

(58) Field of Classification Search
None
See application file for complete search history.

(56) References Cited

U.S. PATENT DOCUMENTS

| | | | | |
|---|---|---|---|---|
| 2009/0037772 | A1* | 2/2009 | Wegerich | G05B 23/0254 714/E11.002 |
| 2010/0131800 | A1* | 5/2010 | Fujimaki | G05B 23/0281 702/183 |
| 2017/0178311 | A1* | 6/2017 | Pal | H04W 4/80 |
| 2017/0284903 | A1* | 10/2017 | Anderson | G01M 99/008 |

(Continued)

FOREIGN PATENT DOCUMENTS

| | | |
|---|---|---|
| JP | 2018-025936 A1 | 2/2018 |
| JP | 2018-103284 A1 | 7/2018 |
| JP | 2018-138327 A1 | 9/2018 |

OTHER PUBLICATIONS

Suh, et al., (2019). Generative Oversampling Method for Imbalanced Data on Bearing Fault Detection and Diagnosis. Applied Sciences, 9(4), 746 (Year: 2019).*

*Primary Examiner* — Rehana Perveen
(74) *Attorney, Agent, or Firm* — BURR PATENT LAW, PLLC

(57) ABSTRACT

A method for labeling a data set of a supervised learning machine includes: calculating a deviation degree from a reference state A for each corresponding data in cases where a plurality of state estimation targets are in the reference state A and a reference state B; calculating a normalized deviation degree by taking a map of the deviation degree from A for each of the corresponding data with a map set for each of the state estimation targets. The map is allowed to map the deviation degree from A in A on a specified value to be output by the supervised learning machine in A; allowed to map the deviation degree from A in B on a specified value to be output by the supervised learning machine in B.

8 Claims, 8 Drawing Sheets

(56) References Cited

U.S. PATENT DOCUMENTS

| | | |
|---|---|---|
| 2018/0181105 A1 | 6/2018 | Shindou |
| 2018/0246494 A1 | 8/2018 | Nakahama |
| 2019/0068618 A1* | 2/2019 | Mestha ............... H04L 63/1466 |
| 2020/0118648 A1* | 4/2020 | Chang ...................... G06N 3/08 |
| 2022/0024607 A1* | 1/2022 | Leitch ....................... B64F 5/60 |
| 2022/0164688 A1* | 5/2022 | Jung ...................... G06N 20/00 |

* cited by examiner

FIG.6

| | |
|---|---|
| REFERENCE STATE A (BEARING NORMAL) | 0.00 |
| REFERENCE STATE B (BEARING DETERIORATED) | 1.00 |
| PRESENT STATE | 0.21 |

METHOD FOR LABELING DATA SET OF SUPERVISED LEARNING MACHINE, SUPERVISED LEARNING MACHINE, AND STATE ESTIMATION APPARATUS

BACKGROUND

1. Technical Field

The disclosure relates to a method for performing labeling on a data set of a supervised learning machine in a machine learning model used for a machine tool and the like for examining a damaged state of a tool and the like, a supervised learning machine created using the method, and a state estimation apparatus provided with the learning machine.

2. Related Art

If a machine tool is continuously used in a state where a bearing that supports a rotator of a machine tool is damaged, it is possible that a processing accuracy of the machine tool decreases and/or the bearing seizes and disables the machine tool from functioning. On the other hand, if the machine tool were continuously used in a state where a cutting tool is significantly abraded, the processing accuracy could decrease and/or an interference occurs by the operation being continued with the broken cutting tool, which causes damage to the machine tool.

Conventionally, to avoid the trouble from occurring, certain criteria such as a time period or the number, for example, a cumulative rotating time of the bearing, a cumulative rotation number of the bearing, and a usage time of the tool, have been set in advance for its management. However, since the criteria do not correspond to an actual state, sometimes countermeasures have been taken in a state where there is no problem to continue the use of the tool, which causes excessive cost, or troubles even though a predetermined time period or the number has not been reached.

In view of the above, it has been examined a method for estimating the actual state of the machine tool instead of using the time period and/or the number. The method captures a state transition of from a normal state to an abnormal state of the machine tool and takes measures before completely reaching an abnormal state.

JP-A-2018-103284 discloses an apparatus that obtains processing information in a state where a tool life sufficiently remains to generate input data and establishes a learning model that creates clusters by unsupervised learning. Accordingly, the apparatus makes an inference on certain input data and determines that a machine tool is in a state where the tool life does not remain when the input data does not belong to a cluster where the tool life sufficiently remains.

JP-A-2018-25936 discloses a machine tool that includes an abnormal score calculating unit that calculates how far apart actual processing data is from normal processing data by inputting the actual processing data in an unsupervised learning machine created using the normal processing data, thereby calculating abnormal scores based on a difference between the input and an output, and a unit that assigns the abnormal scores to a finite numbers of damage levels. Thus, the machine tool is capable of taking measures corresponding to the damage levels.

JP-A-2018-138327 discloses a tool state estimation apparatus that includes a storage unit of a learning model that uses input data based on dynamic information of a vicinity of the tool, such as a chip scattering distance, a chip scattering speed, and a central angle of a chip scattering range, to distinguish the dynamic information of the vicinity of the tool when the tool state is excellent from others, thereby estimating a tool state.

However, the apparatus disclosed in JP-A-2018-103284 uses a learning model that has learned only with processing information in a state where the tool life sufficiently remains. Thus, no one can assume what kind of an inference result will be obtained by the learning model for the processing information in a state where the tool life does not remain, which is the state where the learning model has not learned. Therefore, it is difficult to determine a threshold to cause the apparatus to determine whether the tool life remains or not. Provisionally, even when the inference result of the learning model relative to the processing information in the state where the tool life does not remain is inappropriate, the learning model is not allowed to be improved to obtain a desired inference result. Therefore, there is a problem that states of various state estimation targets cannot be determined using common criteria.

The machine tool disclosed in JP-A-2018-25936 calculates how far apart the actual processing data is from the normal processing data, that is, abnormal scores, by inputting the actual processing data in the unsupervised learning machine created using only the normal processing data. Therefore, for the abnormal processing data in which processing conditions, such as tools, work materials, and cutting speeds, are different, no one can assume what magnitudes the respective abnormal scores have. The abnormal score calculating unit is not allowed to be improved to calculate a desired abnormal score for the abnormal processing data. Therefore, to determine the states of various state estimation targets based on fixed criteria, it is necessary to preliminarily prepare a unit to assign the abnormal scores to a finite number of damage levels for every processing condition. Accordingly, there is a problem that the machine tool cannot take measures against a new processing condition.

With the tool state estimation apparatus disclosed in JP-A-2018-138327, in a case where an unsupervised learning that creates clusters at a time point of excellent tool state is used, when the processing conditions, such as tools, work materials, and cutting speed, are different, no one can assume how far apart inference results of a machine learning model relative to the input data of different process conditions are from the respective clusters at the time point of excellent tool state. Therefore, there is a problem that the states of various state estimation targets cannot be determined by fixed criteria. In a case where a supervised learning is used, there is disclosed a method where each of signals of an output layer is corresponded to an "excellent tool state" or a "deteriorated tool state" and supervised data is established such that one of the signals becomes 1 corresponding to the supervised data. In the supervised learning, the tool state estimation apparatus has a possibility of being capable of determining the states of various state estimation targets by fixed criteria.

However, in the supervised learning, performing suitable labeling in an intermediate state between the two reference states, such as a state between the "excellent tool state" and the "deteriorated tool state", is extremely difficult. When labeling is not performed on the intermediate state, data of the intermediate state cannot be added to training data. Therefore, when a desired inference result is not obtained in the intermediate states, the learning model cannot be improved. JP-A-2018-138327 discloses another example of determining the supervised data every time frame before a predetermined time at which the tool state deteriorates to perform labeling on the respective intermediate states. However, the method cannot perform suitable labeling that corresponds to the deterioration degrees of the tool.

FIG. 1 is a conceptual diagram for describing a problem when referring to time in the labeling in the intermediate state. Here, a usage time of a tool is indicated in the horizontal axis, and a tool abrasion amount as a state to be estimated is indicated in the vertical axis. FIG. 1 illustrates a transition of the tool abrasion amount in three cases described as follows. The first case is a case under a processing condition in which a tool abrasion development is slow. The second case is a case under a processing condition in which the tool abrasion development is fast. The third case is a case where the processing condition is changed in a halfway from the first case to the second case. FIG. 1 illustrates the change of the tool abrasion amount in the first case by a solid line, and the change of the tool abrasion amount in the second case by a dashed line. FIG. 1 is merely a conceptual diagram and the tool abrasion amount might not actually increase in proportion to the usage time of the tool. As illustrated in FIG. 1, it is apparent that the differences in accumulated processing time between a time point of a certain same tool abrasion amount and a time point at which the tool state deteriorates are not the same in the above-described three cases. That is, originally, respective data obtained at the same tool abrasion amount should be attached identical labels in the above-described three cases. However, different labels are attached to them indicating they belong to different time frames before the predetermined time at which the tool state deteriorates with a reason that the accumulated processing times from the time points of the certain same tool abrasion amount to the time points at which the tool states deteriorate are different. Since it is impossible for the learning machine to learn to produce different outputs in response to the same input, when different labels are attached to the same states, it is impossible for the learning machine to perform suitable learning. That is, there is a problem that the learning machine cannot perform the suitable learning when the time is referred for the labeling in the intermediate state.

Meanwhile, to accurately perform the labeling in the intermediate state, it may be considered to check the tool state every time before or after the processing to obtain the state change. However, in this case, it is necessary to spend a lot of time to check the tool state. As a result, the increased time is spent on matters unrelated to the processing, which lowers productivity and thus requires cost on the labeling.

In view of the above, the disclosure is made upon consideration of the described problem. The disclosure has an object to provide a method for labeling a data set of a supervised learning machine, a supervised learning machine, and a state estimation apparatus. They can perform labeling more conforming to an actual state at low cost, in labeling of a data set for determining an output of training data corresponding to an input of the training data of a supervised learning machine for determining states of various state estimation targets based on fixed criteria, even in an intermediate state of two reference states.

Solution to Problem

In order to achieve the above-described object, the present invention according to claim 1 provides a method for labeling a data set of a supervised learning machine. The method determines an output of training data corresponding to an input of the training data. The training data is for creating the supervised learning machine used for estimating a state of a state estimation target between a case where the state estimation target is in a predetermined reference state A and a case where the state estimation target is in a predetermined reference state B different from the reference state A. The method includes: determining any given data as the input of the training data, which is selected from a first physical quantity obtained in a case where the state estimation target is in a predetermined state and data obtained based on the first physical quantity that are related to the state of the state estimation target; referring any given data as corresponding data, which is selected from a second physical quantity obtained in a case where the state of the state estimation target is identical to a state in the case where the first physical quantity relating to the input of the training data is obtained and data obtained based on the second physical quantity that are related to the state of the state estimation target; calculating, for the two or more state estimation targets, a deviation degree from the reference state A for each of a plurality of the corresponding data including at least corresponding data when each of the state estimation targets is in the reference state A and corresponding data when each of the state estimation targets is in the reference state B; setting the map for each of the state estimation targets, as a map for mapping each of the deviation degrees from the reference state A of the plurality of the corresponding data on a normalized deviation degree, the map being allowed to map the deviation degree from the reference state A in the reference state A on a specified value to be output by the supervised learning machine in the reference state A, the map being allowed to map the deviation degree from the reference state A in the reference state B on a specified value to be output by the supervised learning machine in the reference state B, the map being a monotonic map in a section between the deviation degree from the reference state A in the reference state A and the deviation degree from the reference state A in the reference state B; calculating the normalized deviation degree by mapping an image of the deviation degree from the reference state A for each of the plurality of corresponding data using the set map; and determining the normalized deviation degree as the output of the training data corresponding to the input of the training data.

The invention according to claim 2 provides, in the above configuration, when the state of the state estimation target transitions in one direction from one of the reference state A and the reference state B to the other in chronological order, the method includes: calculating, for each of the plurality of state estimation targets, the deviation degree from the reference state A of each of the plurality of corresponding data, and subsequently performing a filter processing in a state where the calculated deviation degrees from the reference state A are arranged in chronological order to convert the calculated deviation degrees from the reference state A into smooth deviation degrees from the reference state A; and using the smooth deviation degree from the reference state A instead of the deviation degree from the reference state A in the setting of the map for mapping the deviation degree from the reference state A of each of the plurality of corresponding data on the normalized deviation degree and in the calculation of the normalized deviation degree.

In order to achieve the above-described object, the invention according to claim 3 provides a method for labeling a data set of a supervised learning machine. The method determines an output of training data corresponding to an input of the training data. The training data is for creating the supervised learning machine used for estimating a state of a state estimation target between a case where the state estimation target is in a predetermined reference state A and a case where the state estimation target is in a predetermined reference state B different from the reference state A. The supervised learning machine has a function of performing a post-process that calculates a representative value of an output group as a set of outputs calculated from respective inputs when a plurality of predetermined data belonging to a data group as a set of a plurality of data are input. The method includes: determining any given data as the input of the training data, which is selected from a first physical quantity obtained in a case where the state estimation target is in a predetermined state and data obtained based on the first physical quantity that are related to the state of the state estimation target; referring any given data as corresponding data, which is selected from a second physical quantity obtained in a case where the state of the state estimation target is identical to a state in the case where the first physical quantity relating to the input of the training data is obtained and data obtained based on the second physical quantity that are related to the state of the state estimation target; calculating, for the two or more state estimation targets, deviation degrees from the reference state A of the corresponding data belonging to a respective plurality of corresponding data group for the respective plurality of corresponding data groups, the corresponding data groups each including at least a first corresponding data group and a second corresponding data group, the first corresponding data group including a plurality of corresponding data when each of the state estimation targets is in the reference state A, and the second corresponding data group including a plurality of the corresponding data when each of the state estimation targets is in the reference state B; determining respective sets of the deviation degrees from the reference state A corresponding to the plurality of corresponding data groups to which the corresponding data corresponding to the respective calculated deviation degrees from the reference state A belong as groups of deviation degrees from the reference state A; applying a process identical to the post-process executed by the supervised learning machine to each of the plurality of groups of deviation degrees from the reference state A to calculate a representative deviation degree from the reference state A in each of the plurality of groups of deviation degrees from the reference state A; setting the map for each of the state estimation targets, as a map for mapping each of the representative deviation degrees from the reference state A corresponding to the plurality of corresponding data groups on a normalized representative deviation degree, the map being allowed to map the representative deviation degree from the reference state A in the reference state A on a specified value to be taken by a representative value calculated by the supervised learning machine in the reference state A, the map being allowed to map the representative deviation degree from the reference state A in the reference state B on a specified value to be taken by a representative value calculated by the supervised learning machine in the reference state B, the map being a monotonic map in a section between the representative deviation degree from the reference state A in the reference state A and the representative deviation degree from the reference state A in the reference state B; calculating the normalized representative deviation degree by mapping an image of the representative deviation degree from the reference state A for each of the plurality of the corresponding data groups using the set map; performing a process acting inversely to the post-process to each of a plurality of the normalized representative deviation degrees and to each of the groups of deviation degrees from the reference state A corresponding to the respective plurality of normalized representative deviation degrees to calculate a normalized individual deviation degree for each of the plurality of corresponding data groups corresponding to the plurality of normalized representative deviation degrees, the normalized representative deviation degree being calculated from the normalized individual deviation degree when the post-process is performed; and determining the normalized individual deviation degree as the output of the training data corresponding to the input of the training data.

The invention according to claim 4 provides, in the above configuration, when the state of the state estimation target transitions in one direction from one of the reference state A and the reference state B to the other in chronological order, the method includes: calculating, for each of the plurality of state estimation targets, the representative deviation degree from the reference state A of each of the plurality of corresponding data groups, and subsequently performing a filter processing in a state where the calculated representative deviation degrees from the reference state A are arranged in chronological order to convert the calculated representative deviation degrees from the reference state A into smooth representative deviation degrees from the reference state A; and using the smooth representative deviation degree from the reference state A instead of the representative deviation degree from the reference state A in the setting of the map for mapping the representative deviation degree from the reference state A of each of the plurality of corresponding data groups on the normalized representative deviation degree and in the calculation of the normalized representative deviation degree.

The invention according to claims 5 and 11 provides a supervised learning machine created using the method for labeling a data set of the supervised learning machine according to claim 1 or 2.

The invention according to claims 6 and 12 provides a state estimation apparatus that includes the supervised learning machine according to claim 5 or 11.

The invention according to claims 7 and 13 is, in the above configurations, configured to simultaneously display an output of the supervised learning machine, a specified value to be output by the supervised learning machine when the state estimation target is in the reference state A, and a specified value to be output by the supervised learning machine when the state estimation target is in the reference state B, as numerical values or in a graph.

The invention according to claims 8 and 14 provides a supervised learning machine created using the method for labeling a data set of the supervised learning machine according to claim 3 or 4.

The invention according to claims 9 and 15 provides a state estimation apparatus that includes the supervised learning machine according to claim 8 or 14.

The invention according to claims 10 and 16 is, in the above configuration, configured to simultaneously display a representative value of the output group output by the supervised learning machine, a specified value to be taken by the representative value calculated by the supervised learning machine when the state estimation target is in the reference state A, and a specified value to be taken by the representative value calculated by the supervised learning machine when the state estimation target is in the reference state B as numerical values or in a graph.

According to the disclosure, the output of the training data determined in the disclosure can give a normalizing function of outputting a common value in the reference state A and the reference state B regardless of the state estimation targets to the supervised learning machine that has learned using the training data including the output determined by the method, or the supervised learning machine having the post-process function has learned using the training data including the output determined by the method.

Furthermore, the output of the training data determined in the disclosure reflects the timing of the transition in the deviation degree from the reference state A also in the case where the state of the state estimation target is intermediate between the reference state A and the reference state B. Therefore, it can give a state estimating ability more conforming to the actual state to the supervised learning machine that has learned using the training data including the output determined by the method, or the supervised learning machine having the post-process function that has learned using the training data including the output determined by the method. That is, even in the intermediate state between the two reference states, labeling of the data set more conforming to the actual state can be performed at low cost.

BRIEF DESCRIPTION OF THE DRAWINGS

FIG. 6 illustrates a screen displayed by a state estimation apparatus.

DETAILED DESCRIPTION

The following describes embodiments of the disclosure based on the drawings.

First, Embodiment 1 will be described.

Figure 1:
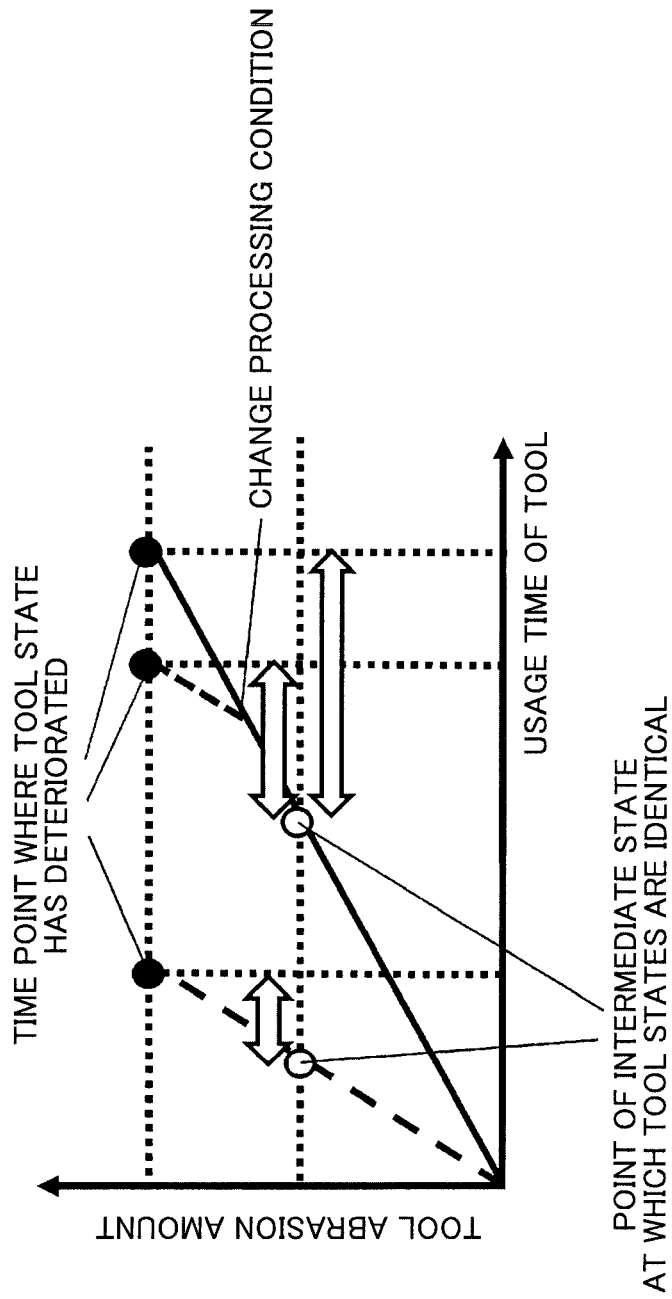
FIG. 1 is a diagram illustrating a problem of referring to a time in labeling of an intermediate state.
Figure 2:
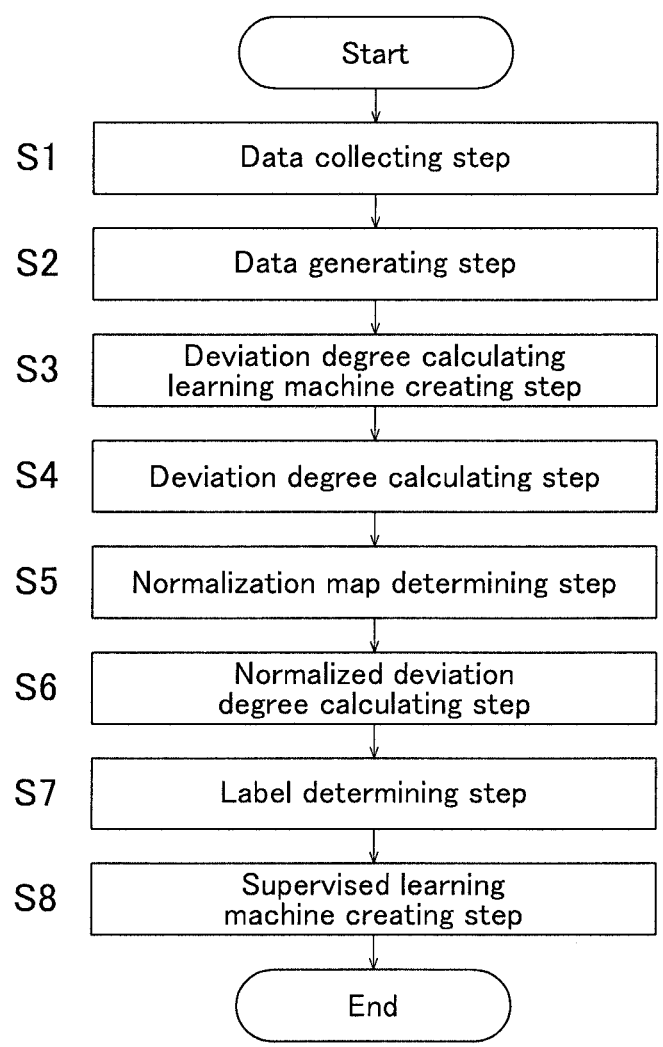
FIG. 2 is a flowchart of a labeling method in Embodiment 1.

FIG. 2 is a flowchart of a method for labeling a data set of a supervised learning machine.

In the description of Embodiment 1 below, a bearing that supports a main spindle in a machine tool is a state estimation target. When the two or more state estimation targets are related, each of the state estimation targets is an individual bearing. A state of the bearing immediately after a start of use is defined as a reference state A. Furthermore, a state where the bearing is to be replaced to new one because of deterioration is defined as a reference state B.

In a data collecting step S1, collecting data necessary for labeling data sets of a supervised learning machine is executed. In Embodiment 1, preliminarily, the main spindle of the machine tool is rotated at a predetermined rotation speed to collect signals of physical quantities of a main spindle motor torque, a vibration of an acceleration sensor attached near the bearing, a temperature of a temperature sensor attached near the bearing, and the like during the rotation, and the collected physical quantities are stored as data. The collection is performed for each predetermined usage time of the machine tool until the bearing state reaches from the state immediately after the start of use, that is, the reference state A to the state where the replacement to new one is required because of the deterioration, that is, the reference state B.

Subsequently to the data collecting step S1, a data generating step S2 in which an input of training data of the supervised learning machine and corresponding data are generated is executed.

The training data is data used for learning of a learning machine so as to cause the learning machine to perform a desired output to a predetermined input. In the application, the training data is used in a meaning including both of the input and the output unless it is specified.

The input of the training data of the supervised learning machine means a physical quantity (first physical quantity) obtained in a case where a state estimation target is in a predetermined state and any given data selected from data that are related to the state of the state estimation target and obtained based on the first physical quantity.

The corresponding data means a physical quantity (second physical quantity) obtained in a case where the state of the state estimation target is a state identical to the case where the first physical quantity is obtained and any given data selected from data that are related to the state of the state estimation target and obtained based on the second physical quantity. It is only necessary that the same state here is in a range where those skilled in the art can consider the state of the state estimation target at the timing of obtaining the second physical quantity as the same state as that of the state estimation target at obtaining the first physical quantity. A case where they are not completely matched as the state of the state estimation target is also allowed. In the description of the disclosure, the corresponding data is used in a meaning including not only the input but also the output of the training data in some cases. The data on the state of the state estimation target obtained based on the first physical quantity and the second physical quantity means data generated by performing predetermined processes such as signal processing on the first physical quantity and the second physical quantity. However, it is not necessary that the types of the first physical quantity and the second physical quantity, the signal processing method, a sampling frequency, and the like are the same between the input of the training data of the supervised learning machine and the corresponding data. That is, the first physical quantity and the second physical quantity may be mutually different physical quantities when they are obtained in the same state of the state estimation target, and the first physical quantity and the second physical quantity may be used as the input of the training data and the corresponding data. Different types of data on the state of the state estimation target corresponding to the respective physical quantities may be generated from the first physical quantity and the second physical quantity that are mutually different types of the physical quantity through mutually different processes, and the generated different types of data on the state of the state estimation target may be used as the respective input of the training data and corresponding data. In addition, for both of the input of the training data and the corresponding data, a plurality of different types of data may be employed.

Information in which a change depending on the state change of the state estimation target can be regarded to be small may be collected and stored in any given state, and the information can be added to the input of the training data of the supervised learning machine and/or the corresponding data. The information in which a change depending on the state of the state estimation target can be regarded to be small includes, for example, a main spindle mass and a vibratility of an acceleration sensor attached near the bearing, that is, a magnitude of a transfer function from a force generated due to the bearing damage to a vibration acceleration at the position of the acceleration sensor in each frequency.

At the data generating step S2 of Embodiment 1, as the input of the training data of the supervised learning machine, a vibration amplitude for each frequency obtained by a frequency analysis of the vibration of the acceleration sensor, the main spindle mass, and the vibratility for each frequency of the acceleration sensor attached near the bearing are used. The vibratility of the acceleration sensor attached near the bearing includes, for example, an inertance. As the corresponding data, a time series waveform of the main spindle motor torque, a time series waveform of the vibration, and a time series waveform of the temperature are employed.

Next, a deviation degree calculating learning machine creating step S3 is executed to create a deviation degree calculating learning machine for calculating a deviation degree from the reference state A.

As an example of the learning machine usable as a learning machine configured to calculate the deviation degree from the reference state A, an unsupervised learning machine such as an auto encoder, a learning machine that performs prediction learning, and a variational auto encoder (VAE), which are created using corresponding data in which the state of the state estimation target can be regarded to be close to the reference state A as training data, are included.

The auto encoder is a deep neural network in which the input and the output have the same number of units, the same training data is used for both the input and the output, and learning is performed to minimize an error between the input and the output. Therefore, for data included in the training data and obtained in a case where the state of the state estimation target can be regarded to be close to the reference state A, an error between the input corresponding data and an output when the corresponding data is input to the auto encoder is calculated to be small. Meanwhile, as the state of the state estimation target at the timing of obtaining the data approaches the reference state B from the reference state A, the error between the input corresponding data and the output when the corresponding data is input to the auto encoder is calculated to be gradually increased. Thus, the error can be as the deviation degree from the reference state A.

The learning machine that performs prediction learning uses the deep neural network that performs learning so as to use data former in time of the training data as the input and data later in time of the training data as the output. For data contained in the training data in which the state of the state estimation target can be regarded to be close to the reference state A, an error between the output when the data former in time of the corresponding data is input and the data later in time of the corresponding data is calculated to be small. Meanwhile, as the state of the state estimation target at the timing of obtaining the data approaches the reference state B from the reference state A, the error between the output when the data former in time of the corresponding data is input to the learning machine that performs prediction learning and the data later in time of the corresponding data is input is calculated to be gradually increased. Thus, the error can be as the deviation degree from the reference state A.

The VAE is one form of the auto encoder, and configured to calculate an average and a variance especially in the intermediate layer. VAE is known to be remarkable in its property of not reproducing characteristics that are not included in the training data. For data contained in the training data in which the state of the state estimation target can be regarded to be close to the reference state A, an error between the input corresponding data and the output when the corresponding data is input to the VAE is calculated to be small. Meanwhile, as the state of the state estimation target at the timing of obtaining the data approaches the reference state B from the reference state A, the error between the input corresponding data and the output when the corresponding data is input to the VAE is calculated to be gradually increased. Thus, the error can be as the deviation degree from the reference state A.

Any of the exemplified learning machines has a property in which the learning using the data regarded to be close to the reference state A allows the calculation of the deviation degree from the reference state A, and can be replaced with a learning machine having the similar property.

The learning machine configured to calculate the deviation degree from the reference state A may be created for each of the state estimation targets, and may be created for each group of several state estimation targets. Only one learning machine configured to calculate the deviation degree from the reference state A may be created for all of the state estimation targets.

In the deviation degree calculating learning machine creating step S3 of Embodiment 1, for a bearing BR1 that supports a main spindle of a model MA as a machine tool and a bearing BR2 that supports a main spindle of a model MB that has a different vibratility of the acceleration sensor attached near the bearing from the model MA, the learning of the auto encoder as the deviation degree calculating learning machine is performed using the corresponding data collected at a timing regarded to be close to the state immediately after the start of use (reference state A) as the training data.

In a deviation degree calculating step S4 as the next step, a plurality of the corresponding data obtained from the state immediately after the start of use of the bearing BR1 and the bearing BR2 (reference state A) to the state where the replacement to new one is required because of the deterioration (reference state B) are each input to the auto encoder that has already learned, which is created in the deviation degree calculating learning machine creating step S3, and the corresponding output for each of the input corresponding data is calculated. Furthermore, based on the input corresponding data and the calculated output, the error between the output calculated when each of the corresponding data is input to the auto encoder and the input corresponding data is calculated as the deviation degree from the reference state A. In Embodiment 1, as the deviation degree from the reference state A, an average of absolute values of the errors between the output when the corresponding data is input to the auto encoder and the input corresponding data is used.

In another embodiment, for example, an average of squares of differences between the output when one of the corresponding data is input to the auto encoder and the input corresponding data may be used as the deviation degree from the reference state A. Thus, an average of absolute values as the deviation degree from the reference state A may be replaced with another value that can be regarded as the error between the input and the output, which is determined based on the output when one of corresponding data is input to the auto encoder and the input corresponding data.

Figure 3:
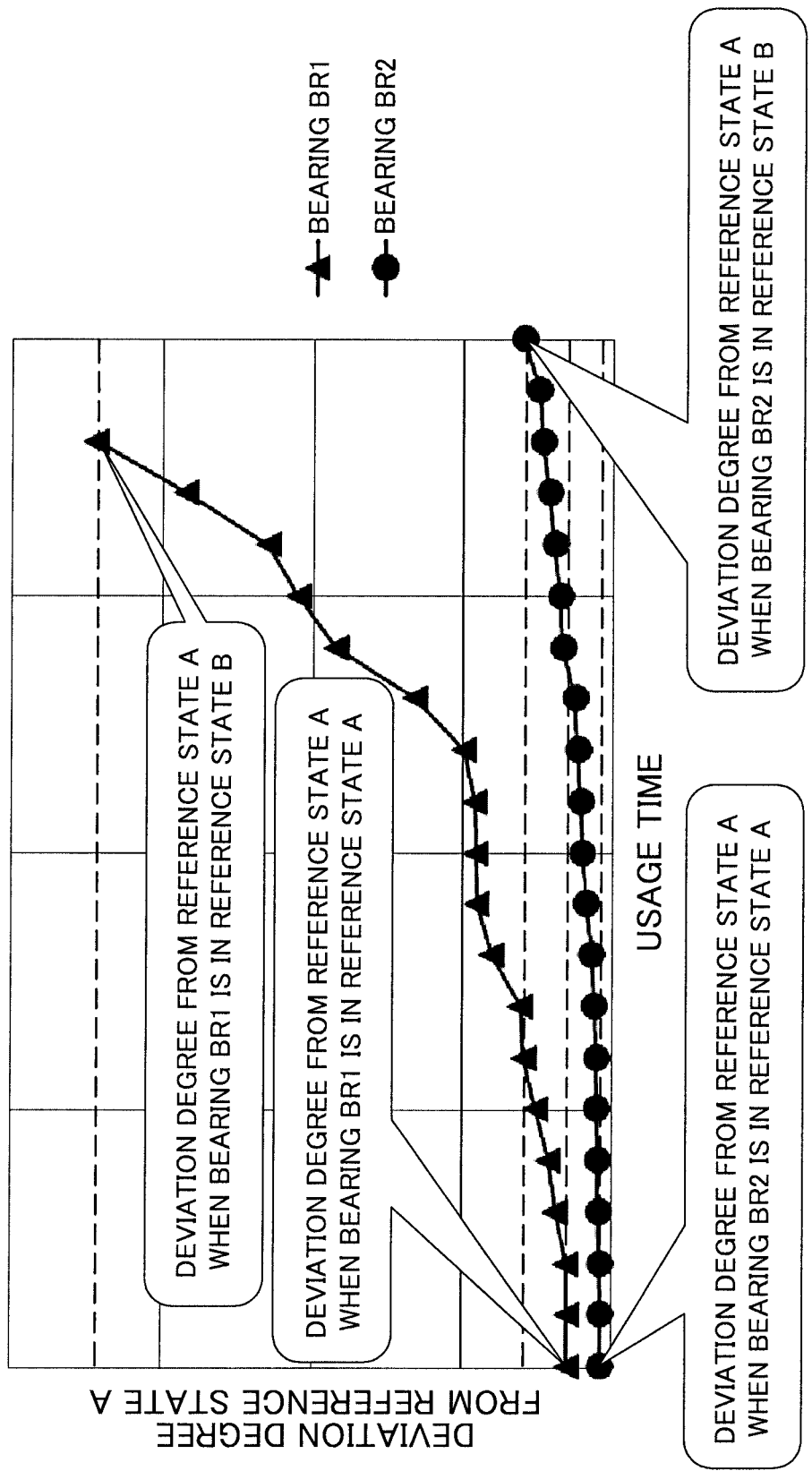
FIG. 3 is a diagram illustrating a deviation degree from a reference state A.

In the deviation degree calculating step S4, each of the plurality of corresponding data obtained from the state immediately after the start of use of the bearing BR1 and the bearing BR2 (reference state A) to the state where the replacement to new one is required because of the deterioration (reference state B) is input to the auto encoder that has already performed learning in the deviation degree calculating learning machine creating step S3, thus calculating the deviation degree from the reference state A. FIG. 3 illustrates the calculated deviation degrees from the reference state A of the bearings BR1 and BR2.

Figure 4:
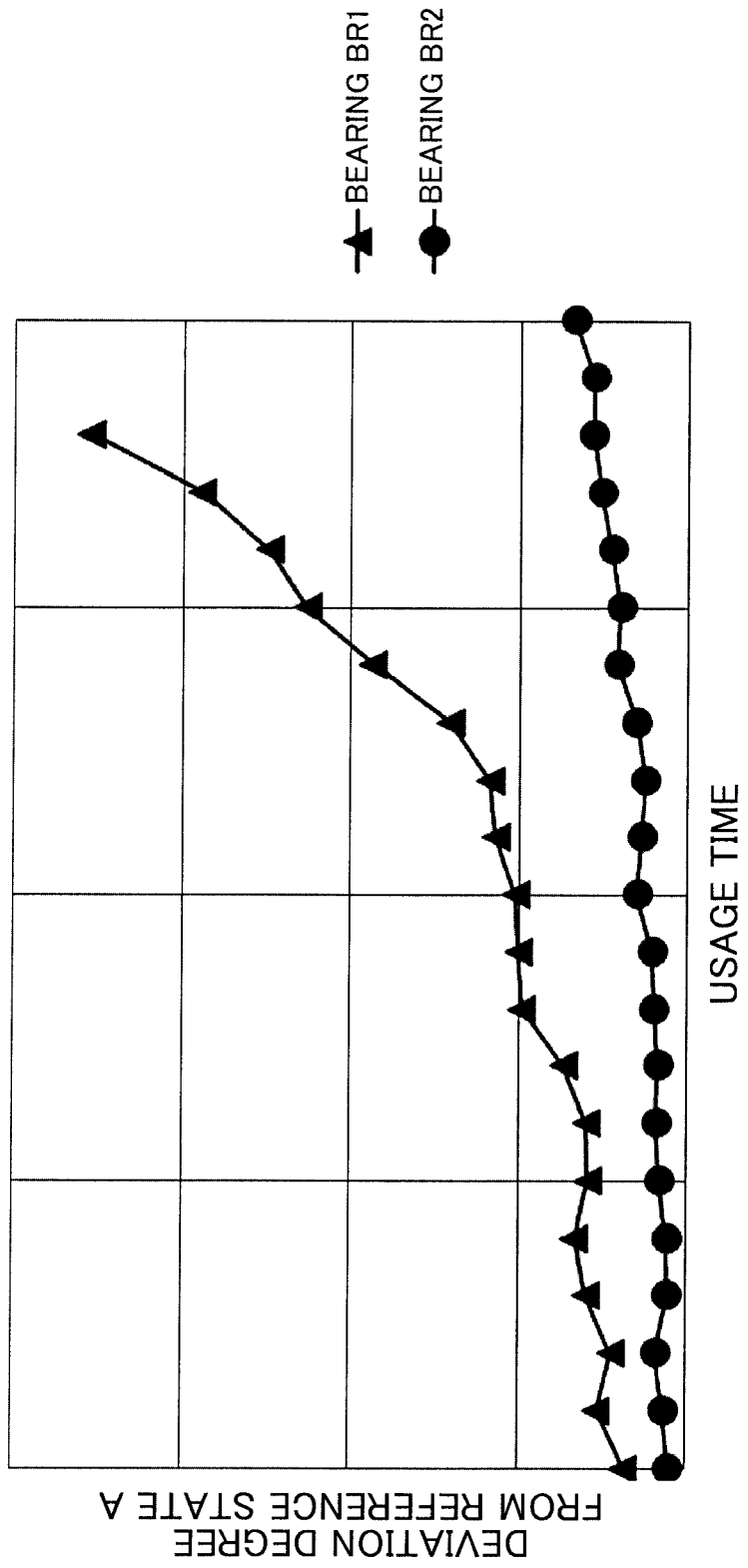
FIG. 4 is a diagram illustrating the deviation degree from the reference state A with a measurement variation.

The state changes of the bearings BR1 and BR2 are any of deteriorated or not changed, and the deterioration state does not return to a state without deterioration. That is, the states of the bearings BR1 and BR2 are supposed to change in one direction from the reference state A to the reference state B. Therefore, when the deviation degree from the reference state A obtained in the deviation degree calculating step S4 is not calculated as a monotonic increasing as illustrated in FIG. 4, it is estimated that an influence of a phenomenon unrelated to the deterioration of the states of the bearings BR1 and BR2, for example, a measurement variation, is included. When it is estimated that a component unrelated to the deterioration of the states of the bearings BR1 and BR2 is included in the deviation degree from the reference state A, in a state where the deviation degrees from the reference state A are arranged in chronological order, a moving average filter, a low-pass filter, or the like is applied to the deviation degrees from the reference state A to convert them into smooth deviation degrees from the reference state A, thereby allowing removal of the component unrelated to the deterioration of the states of the bearings BR1 and BR2. When filter processing is performed on the deviation degree from the reference state A, the smooth deviation degree from the reference state A is used instead of the deviation degree from the reference state A in the following steps.

Thus, in the deviation degree calculating step S4, the deviation degree from the reference state A, or the smooth deviation degree from the reference state A is calculated.

In a subsequently executed normalization map determining step S5, a map (normalization map) is determined. The map (normalization map) is used for mapping the deviation degrees from the reference state A of the respective plurality of corresponding data which are calculated in the deviation degree calculating step S4 and obtained from the states of the bearings BR1 and BR2, or the smooth deviation degrees from the reference state A of the respective plurality of corresponding data which are calculated in the deviation degree calculating step S4 and obtained from the states of the bearings BR1 and BR2, as normalized deviation degrees on an image in a normalized deviation degree calculating step S6. In the following description of Embodiment 1, for ease of understanding, the deviation degree from the reference state A and the smooth deviation degree from the reference state A are collectively referred to as the deviation degree from the reference state A. However, as described above, in the steps described below, when the deviation degree from the reference state A without the filter processing is used, only the deviation degree from the reference state A without the filter processing is used, and when the smooth deviation degree from the reference state A is used, only the smooth deviation degree from the reference state A is used. Therefore, the deviation degree from the reference state A and the smooth deviation degree from the reference state A are not used together.

Here, assume that the deviation degree from the reference state A in the case of the reference state A is a deviation degree $V_A$, the deviation degree from the reference state A in the case of the reference state B is a deviation degree $V_B$, a specified value to be output by the supervised learning machine in the case of the reference state A is a specified value $W_A$, a specified value to be output by the supervised learning machine in the case of the reference state B is a specified value $W_B$, and a positive power index is n. At this time, a map that satisfies all of three properties below is usable as a map that maps the deviation degrees from the reference state A (V) of the respective plurality of corresponding data on a normalized deviation degree W. The first property is that the map can map the deviation degree $V_A$ on the specified value $W_A$. The second property is that the map can map the deviation degree $V_B$ on the specified value $W_B$. The third property is that the map is a monotonic map in a section between the deviation degree $V_A$ and the deviation degree $V_B$. As a map satisfying the three properties, one as Math. 1 below is considered.

Note that, not limited to the bearing, when determining a map for each of the desired state estimation targets, by setting the specified value $W_A$ and the specified value $W_B$ to the same value for all of the state estimation targets, the supervised learning machine that has learned with the training data created by the labeling method of the disclosure can include the normalizing function. The normalizing function here means a function that makes the output of the supervised learning machine in a common range of from the specified value $W_A$ to the specified value $W_B$ without depending on the state estimation target when the state estimation target is in a state of a range from the reference state A to the reference state B.

Figure 5:
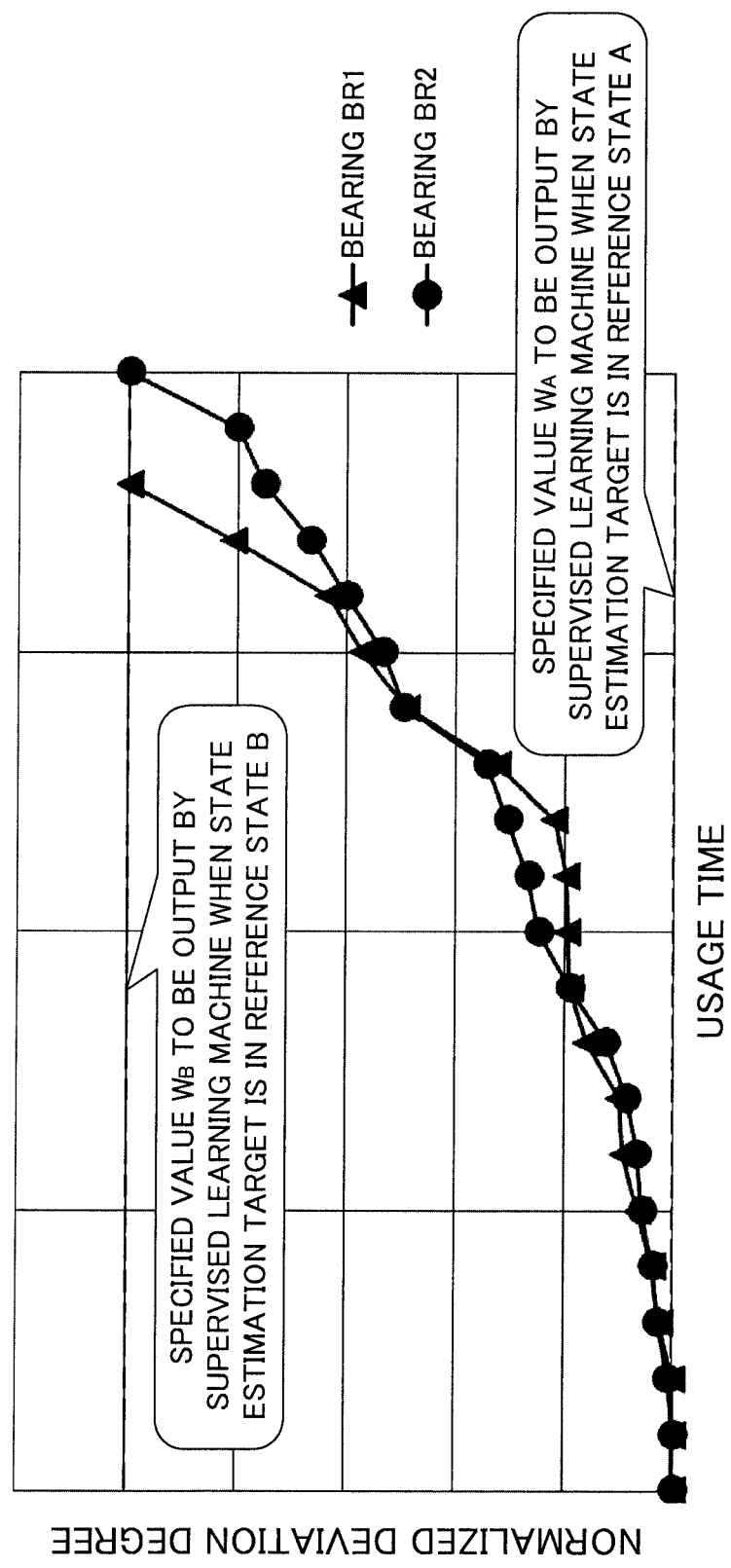
FIG. 5 is a diagram illustrating a normalized deviation degree.

When $V_A < V_B$, $W_A < W_B$, and n=1 are satisfied, Math 1 is a monotonically increasing map in a narrow sense. Since the respective values of the bearings BR1 and BR2 are used for the deviation degree $V_A$ and the deviation degree $V_B$, the maps are determined for the respective bearings BR1 and BR2. However, the specified values $W_A$ and $W_B$ are values common between the bearings BR1 and BR2. When using maps corresponding to the respective bearings BR1 and BR2, the deviation degrees V (FIG. 3) of the respective bearings BR1 and BR2 are mapped on the normalized deviation degrees W (FIG. 5) of the respective bearings BR1 and BR2. For the normalized deviation degrees in FIG. 5, in both of the bearings BR1 and BR2, the normalized deviation degree in the case of the reference state A is the specified value $W_A$ and the normalized deviation degree in the case of the reference state B is the specified value $W_B$.

$$W = (W_B - W_A)\left(\frac{V - V_A}{V_B - V_A}\right)^n + W_A (n > 0) \quad \text{[Math. 1]}$$

Any given map satisfying the above-described three properties, such as Math. 2 below in which Math. 1 is added by any given proportion, can be used as a map for mapping the deviation degree from the reference state A (V) on the normalized deviation degree W.

$$W = 0.2\left[(W_B - W_A)\left(\frac{V - V_A}{V_B - V_A}\right)^{0.1} + W_A\right] + \quad \text{[Math. 2]}$$
$$0.3\left[(W_B - W_A)\left(\frac{V - V_A}{V_B - V_A}\right)^1 + W_A\right] +$$

-continued $$0.5\left[(W_B - W_A)\left(\frac{V - V_A}{V_B - V_A}\right)^3 + W_A\right]$$

For a map created without using Math. 1 or Math. 2 (hereinafter referred to as a "map candidate"), when it is confirmed to satisfy all of the three properties, the map can be used as a map used in the normalized deviation degree calculating step S6 for mapping the deviation degree from the reference state A (V) on the normalized deviation degree W. The following describes a method for confirming whether a map candidate satisfies the three properties or not.

For confirming that the map candidate satisfies the first property, it is only necessary to confirm whether a value when a map of the deviation degree $V_A$ is obtained by the map candidate matches the specified value $W_A$ to be output by the supervised learning machine in the reference state A or not. Alternatively, it is only necessary to confirm that a value when a map of the deviation degree $V_A$ is obtained by the map candidate is within a range of a predetermined error relative to the specified value $W_A$.

For confirming that the map candidate satisfies the second property, it is only necessary to confirm whether a value when a map of the deviation degree $V_B$ is obtained by the map candidate matches the specified value $W_B$ or not. Alternatively, it is only necessary to confirm that a value when a map of the deviation degree $V_B$ is obtained by the map candidate is within a range of a predetermined error relative to the specified value $W_B$.

For confirming that the map candidate satisfies the third property, it is only necessary to confirm that, when the map candidate is a differentiable function, the first-order differentiation value of the function is constantly 0 or more, or constantly 0 or less in a section between the deviation degree $V_A$ and the deviation degree $V_B$. Depending on an object of the state estimation, when the value mapping the deviation degree from the reference state A by the map candidate is allowed to be constant in a part of the section of the deviation degree from the reference state A, it is only necessary to confirm whether the map candidate is a monotonic increasing in a broad sense or a monotonic decreasing in a broad sense including that the first-order differentiation value of the map candidate takes 0 or not. When the value mapping the deviation degree from the reference state A by the map candidate is not allowed to be constant in a part of the section of the deviation degree from the reference state A, it is only necessary to confirm whether the map candidate is a monotonic increasing in a narrow sense or a monotonic decreasing in a narrow sense not including that the first-order differentiation value of the map candidate takes 0 or not.

Meanwhile, when the map candidate is not a differentiable function, it is necessary to make a confirmation as follows. The deviation degree from the reference state A (V) is gradually changed from the deviation degree $V_A$ to the deviation degree $V_B$, for example, by 1/10000 of the section from the deviation degree $V_A$ to the deviation degree $V_B$. Values of the respective maps of the changed deviation degree from the reference state A (V) are calculated by the map candidate. Then, it is confirmed that the value of the map constantly increases or constantly decreases before and after changing the deviation degree from the reference state A (V). When it is allowed that the value of the map does not change, it is only necessary to confirm whether it never increases or never decreases.

As described above, in the normalization map determining step S5, the map for mapping the deviation degree from the reference state A (V) on the normalized deviation degree W is determined for each state estimation target.

Subsequently, in the normalized deviation degree calculating step S6, the deviation degree from the reference state A (V) is mapped on the normalized deviation degree W using the map for mapping the deviation degree from the reference state A (V) on the normalized deviation degree W determined in the normalization map determining step S5.

Then, in a label determining step S7, the normalized deviation degree W, calculated with the corresponding data obtained in the same state where the state estimation target corresponding to the input of the training data, is determined as the output of the training data corresponding to the input of the training data of the supervised learning machine.

Subsequently, a supervised learning machine creating step S8 for performing the learning of the supervised learning machine is executed with the training data in which the input of the training data is combined with the normalized deviation degree W as the output of the training data.

As the supervised learning machine employed here, it is only necessary to employ a supervised learning machine that can perform regression such that the normalized deviation degree W is output according to the input of the training data. As an example of a supervised learning machine that can perform regression, a deep neural network can be used. Furthermore, a supervised learning machine as below can be used. In the supervised learning machine, a process of discretizing the normalized deviation degree W, which is the output of the training data corresponding to the input of the training data of the supervised learning machine and employed in the label determining step S7, is performed to calculate the discretized normalized deviation degree, and which of the discretized normalized deviation degrees the input of the training data is classified in is learned. As an example of a supervised learning machine that performs the classification, a support vector machine can be used.

For example, a learned supervised learning machine created in the supervised learning machine creating step S8 can be used for estimating the state of a bearing BR3 that supports the main spindle of a model MC having a different vibratility of the acceleration sensor attached near the bearing from the model MA and the model MB. That is, a physical quantity obtained for another state estimation target during an actual operation, or an input that is generated by performing signal processing or the like on the physical quantity as necessary and has contents the same as those of the input of the training data of the supervised learning machine is input to the learned supervised learning machine. Then, the state of the bearing BR3 can be determined depending on whether a value of the inference result (output) obtained through the input is closer to the specified value $W_A$ or specified value $W_B$. The data input to the learned supervised learning machine is the vibration amplitude for each frequency obtained by a frequency analysis of the vibration of the acceleration sensor, the main spindle mass, and the vibratility for each frequency of the acceleration sensor attached near the bearing employed as the training data in the data generating step S2.

Figure 7:
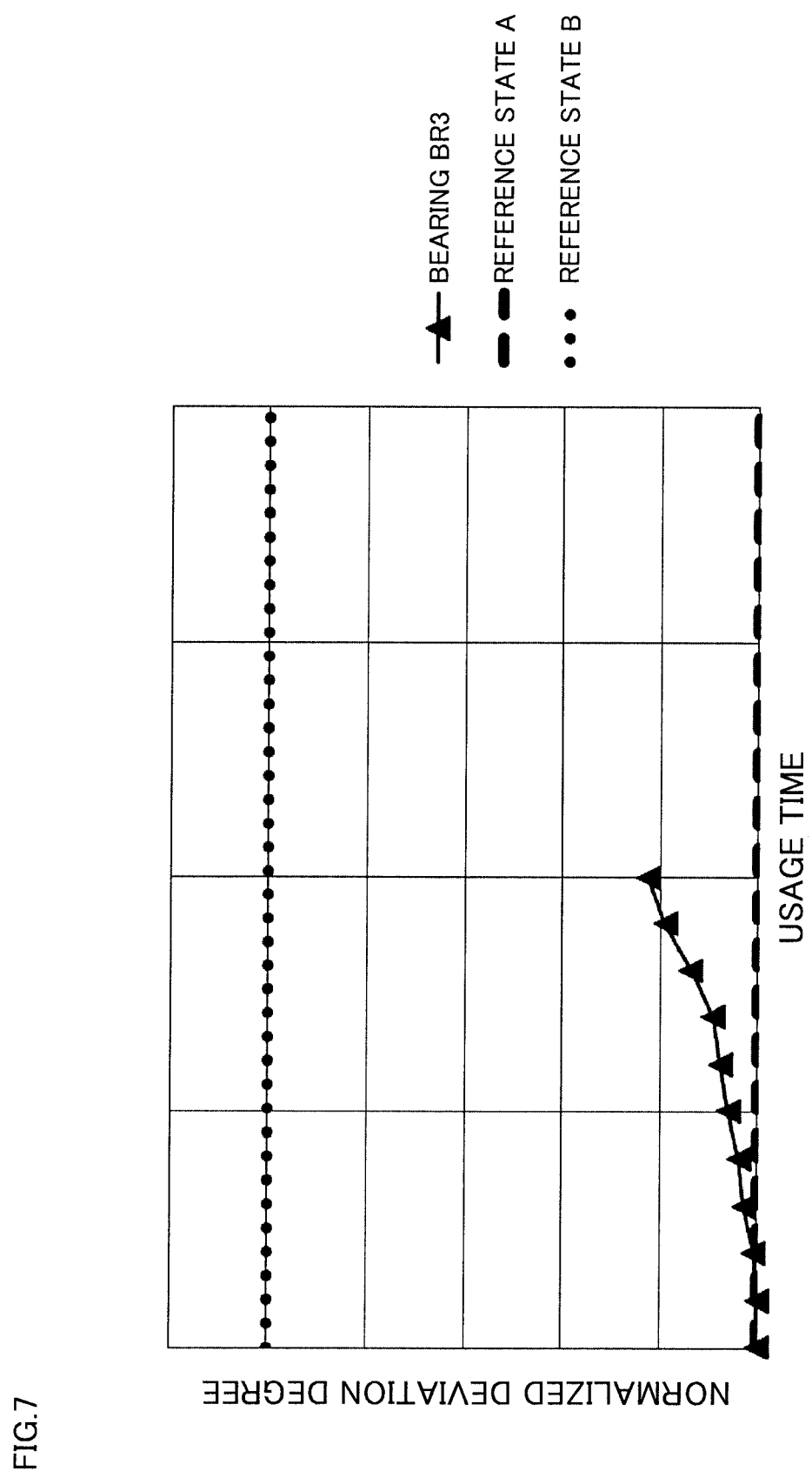
FIG. 7 illustrates a screen displayed by the state estimation apparatus.

Accordingly, as illustrated in FIG. 6 or FIG. 7, by providing display units to display the specified value $W_A$ (0.00) to be output by the supervised learning machine in the case of the reference state A, and the specified value $W_B$ (1.00) to be output by the supervised learning machine in the case of the reference state B as numerical values or in a graph, simultaneously with the value of the inference result (0.21), the supervised learning machine can function as a state estimation apparatus. A state estimation apparatus may be configured by providing a usable supervised learning machine and a predetermined display unit that can simultaneously display the specified value $W_A$, the specified value $W_B$, and the value of the inference result to a predetermined apparatus.

Furthermore, the state estimation apparatus may include a notification unit that displays a warning in the screen or notifies a machine administrator or a machine tool supplier that performs repair by replacing the bearing of the warning by e-mail or the like at a timing of exceeding a threshold. The threshold may be a value between the specified value $W_A$ and the specified value $W_B$ (for example, $0.2 \times W_A + 0.8 \times W_B$).

The values illustrated in FIG. 6 and FIG. 7 and the value exemplified as the threshold are virtual values, and the exemplified values are not actually calculated or set.

Next, Embodiment 2 will be described.

Embodiment 2 is described in terms of a drill used for processing holes in a machining center as a state estimation target, a reference state A as a state immediately after a start of use, and a reference state B as a state where the replacement to new one is required because of the deterioration. In this case, two or more state estimation targets signify separate individual drills.

When performing learning and inference of a supervised learning machine, the numbers of data input to the supervised learning machine are required to be identical. For example, when a predetermined diagnostic operation is performed to collect data with the same lengths for diagnosing the bearing of the spindle as described in Embodiment 1, since the numbers of data are the same, the data can be directly input. However, a processing time for processing holes with a drill may differ according to contents of the processing. In this case, to adjust the numbers of input data to be equal, for example, a starting time of a cutout is shifted little by little to cut out information by an amount of a predetermined time period. Then, by performing a post-process of determining a representative value from a plurality of outputs (output group) calculated through an inference by a supervised learning machine using each data in the plurality of cut out data (data group) as inputs, the state can be indicated for each hole processing. When "group" is attached to the end of a noun, such as "data group" and "output group", it indicates a set as a population for calculating the representative value representing the state. Therefore, for example, to diagnose the bearing of the main spindle, it is possible to successively perform operations of different rotation speeds in a short period of time in which the state of the bearing can be regarded to have not changed almost at all and treat a plurality of data including different types of data each collected and stored as one data group. For the post-process of calculating the representative value from the output group, a suitable method may be selected depending on the type of the state estimation target or the data collecting method. For example, when repeating the same measurements to reduce the influence of the measurement variation, an average value of the output group can be used as the representative value. In the application, the post-process means a process for determining the data representing the set in the set of predetermined data, and what processing is performed to determine the representative data can be arbitrarily set.

As in the series of operations to process holes with the drill, when there exists a non-processing section before reaching a workpiece and a processing section in which the workpiece is being cut, since the drill does not contact the workpiece in the non-processing section, a main spindle load and a feed axis load take similar values in any state of from the reference state A to the reference state B. Therefore, the supervised learning machine should learn to calculate an output similar to an output in the reference state A even in a state close to the reference state B in the non-processing section. Alternatively, the supervised learning machine needs to learn to calculate a different output to almost the same input, thus becoming incapable of performing suitable learning. However, when the average value of the output group is employed as the representative value, for example, even when approaching the reference state B, a value similar to the reference state A will be calculated in a case where a ratio of the non-processing section is large. In this case, the use of the largest value of the output group as the representative value ensures capturing a transition of the state without depending on the ration between the non-processing section and the processing section. The largest value of the output group is used as the representative value when the specified value to be output by the supervised learning machine in the reference state B is larger than the specified value to be output by the supervised learning machine in the reference state A. Meanwhile, it is necessary that the smallest value of the output group is used as the representative value when the specified value to be output by the supervised learning machine in the reference state B is smaller than the specified value to be output by the supervised learning machine in the reference state A. In Embodiment 2, a post-process in which the largest output value of the output group of the supervised learning machine is used as the representative value is used as the post-process.

Note that, even in the hole processing with the drill, separately providing another learning machine configured to distinguish between the non-processing section and the processing section ensures selectively inferring only a data group of the processing section. Thus, it is possible to employ a post-process in which the average value of the output group is used as the representative value. Furthermore, in a post-process of calculating the representative value from the output group, for example, it is possible to obtain the largest value by taking a moving average of a successive plurality of outputs.

Figure 8:
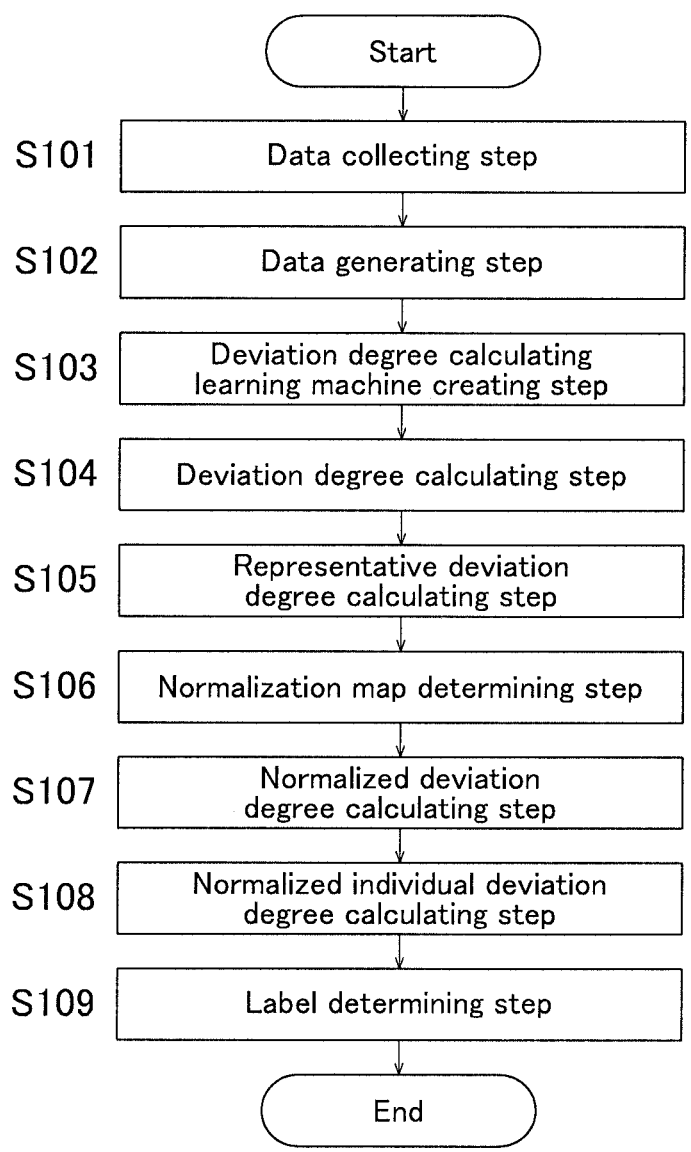
FIG. 8 is a flowchart of a labeling method in Embodiment 2.

FIG. 8 is a flowchart of another method for performing the labeling. Embodiment 2 will be specifically described based on the flowchart.

In a data collecting step S101, collecting data necessary for labeling data sets of a supervised learning machine is executed. In Embodiment 2, a series of operations to perform hole processing with a drill is repeated from immediately after a start of use until reaching a state where the replacement to new one is required because of the deterioration, and a main spindle motor torque and a feed axis motor torque during the operations are collected and stored.

Subsequently, as a data generating step S102, an input of training data of the supervised learning machine and corresponding data are generated.

For the main spindle motor torque and the feed axis torque in the series of operations to perform the hole processing with the drill collected in the data collecting step S101, a process of cutting out data by an amount of a predetermined length of time period T2 (for example, T2=0.5 seconds) is repeated while shifting the cutout starting time by only a predetermined time period T1 (for example, T1=0.01 seconds). Then, inputs of a plurality of training data at timings when the state estimation target can be regarded to be in the same state is generated. Here, when T1=0.01 seconds and T2=0.5 seconds are satisfied, data from 0 seconds after a start of processing to 0.5 seconds after a start of processing, data from 0.01 seconds after the start of processing to 0.51 seconds after the start of processing, . . . are obtained.

In Embodiment 2, data the same as the inputs of the respective training data are employed as the corresponding data. As described above, the corresponding data does not need to be the same as the input of the training data insofar as it is collected in the same state as the training data. Information in which a change depending on the state change of the state estimation target can be regarded to be small may be collected in any given state and added to the input of the training data and the corresponding data.

Next, a deviation degree calculating learning machine creating step S103 is executed to create a deviation degree calculating learning machine for calculating a deviation degree from the reference state A.

In Embodiment 2, in the deviation degree calculating learning machine creating step S103, for a drill DR1 and a drill DR2 having a tool diameter different from that of the drill DR1, the learning of the auto encoder is performed using the corresponding data collected in the state immediately after the start of use (reference state A) as training data.

In Embodiment 2, as the deviation degree from the reference state A, an average of the absolute values of the differences between the output at which the corresponding data is input to the auto encoder and the input corresponding data is used. Accordingly, in the deviation degree calculating learning machine creating step S103, the auto encoder is caused to perform learning to calculate an average of absolute values of differences between the output of the training data corresponding to the input of the training data and the input of the training data based on the input of the training data. In another configuration, the deviation degrees from the reference state A can be replaced with other values determined based on the errors between the input and the output of the auto encoder, such as an average of the squares of the differences between the output at which certain corresponding data is input to the auto encoder and the input corresponding data.

In a deviation degree calculating step S104, a plurality of the corresponding data are obtained from the state immediately after the start of use of the drills DR1 and DR2 (reference state A) to the state where the replacement to new one is required because of the deterioration (reference state B). Then, the plurality of corresponding data are each input to the auto encoder that has already learned in the deviation degree calculating learning machine creating step S103, thus calculating the deviation degree from the reference state A. At this time, the calculated deviation degrees from the reference state A of the plurality of corresponding data are based on the respective corresponding data each belonging to any of a plurality of corresponding data groups. The plurality of corresponding data groups respectively includes at least a first corresponding data group and a second corresponding data group. The first corresponding data group includes a plurality of the corresponding data when the drills DR1 and DR2 are in the reference state A. The second corresponding data group includes a plurality of the corresponding data when the drills DR1 and DR2 are in the reference state B. For a plurality of deviation degrees from the reference state A calculated by inputting each of the plurality of corresponding data belonging to one corresponding data group, they are collectively referred to as a "group of deviation degrees from the reference state A".

In a representative deviation degree calculating step S105, a process the same as the post-process to the output group of the supervised learning machine is applied to the group of deviation degrees from the reference state A calculated in the deviation degree calculating step S104, thus calculating a representative deviation degree from the reference state A.

A process of determining a largest deviation degree from the reference state A in the group of deviation degrees from the reference state A as the representative deviation degree from the reference state A is performed for each of the groups of deviation degrees from the reference state A calculated from the respective plurality of corresponding data groups, thus calculating the representative deviation degree from the reference state A for each of the plurality of corresponding data groups.

The states of the drills DR1 and DR2 are any of deteriorated or not changed, and the deterioration state does not return to a state without deterioration. That is, the states of the drills DR1 and DR2 are supposed to change in one direction from the reference state A to the reference state B. Therefore, when the representative deviation degree from the reference state A obtained in the representative deviation degree calculating step S105 is not a monotonic increasing, it is estimated that an influence of a phenomenon unrelated to the deterioration of the states of the drills DR1 and DR2, for example, a measurement variation, is included. When it is estimated that a component unrelated to the deterioration of the states of the drills DR1 and DR2 is included, in a state where the representative deviation degrees from the reference state A are arranged in chronological order, a moving average filter, a low-pass filter, or the like is applied to the representative deviation degree from the reference state A to convert it into a smooth representative deviation degree from the reference state A, thereby allowing removal of the component unrelated to the deterioration of the states of the drills DR1 and DR2. When filter processing is performed on the representative deviation degree from the reference state A, the smooth representative deviation degree from the reference state A is used instead of the representative deviation degree from the reference state A in the following steps.

Thus, in the representative deviation degree calculating step S105, the representative deviation degree from the reference state A, or the smooth representative deviation degree from the reference state A is calculated.

In a subsequently executed normalization map determining step S106, a map (normalization map) is determined. The map (normalization map) is used for mapping the representative deviation degrees from the reference state A or the smooth representative deviation degrees from the reference state A of the respective plurality of corresponding data groups, which are calculated in the representative deviation degree calculating step S105 and obtained from the states of the drills DR1 and DR2, as a normalized representative deviation degree on an image in a normalized representative deviation degree calculating step S107. In the following description of Embodiment 2, or ease of understanding, the representative deviation degree from the reference state A and the smooth representative deviation degree from the reference state A are collectively referred to as the representative deviation degree from the reference state A. However, as described above, in the steps described below, when the representative deviation degree from the reference state A without the filter processing is used, only the representative deviation degree from the reference state A without the filter processing is used, and when the smooth representative deviation degree from the reference state A is used, only the smooth representative deviation degree from the reference state A is used. Therefore, the representative deviation degree from the reference state A and the smooth representative deviation degree from the reference state A are not used together.

Here, assume that the representative deviation degree from the reference state A in the case of the reference state A is a representative deviation degree $V_A^*$, the representative deviation degree from the reference state A in the case of the reference state B is a representative deviation degree $V_B^*$, a specified value to be taken by the representative value in the case of the reference state A is a specified value $W_A^*$, and a specified value to be taken by the representative value in the case of the reference state B is a specified value $W_B^*$. At this time, a map that satisfies all of three properties below is usable as a map that maps representative deviation degrees V* from the reference state A of the respective plurality of corresponding data groups on a normalized representative deviation degree W. The first property is that the map can map the representative deviation degree $V_A^*$ on the specified value $W_A^*$. The second property is that the map can map the representative deviation degree $V_B^*$ on the specified value $W_B^*$. The third property is that the map is a monotonic map in a section between the representative deviation degree $V_A^*$ and the representative deviation degree $V_B^*$. A map satisfying the three properties is determined as a map for mapping the representative deviation degree V* from the reference state A on the normalized representative deviation degree W.

Subsequently, the representative deviation degree V* from the reference state A is mapped on the normalized representative deviation degree W* using the map for mapping the representative deviation degree V* from the reference state A on the normalized representative deviation degree W*.

Furthermore, in a normalized individual deviation degree calculating step S108, a process acting inversely to the post-process is performed to the normalized representative deviation degree V* and a group of deviation degrees GP from the reference state A corresponding to the normalized representative deviation degree V*, thus calculating a normalized individual deviation degree U*.

Here, since the post-process is a predetermined process for determining data as a representative of a set of predetermined data from the set of predetermined data, the process acting inversely to the post-process means a predetermined process for deriving the set of predetermined data having the data as the representative data. Accordingly, it is only necessary that the process acting inversely to the post-process, executed in the normalized individual deviation degree calculating step S108 in Embodiment 2, is a process in which the normalized representative deviation degree W* is obtained by performing the post-process on the normalized individual deviation degree U* calculated through the process acting inversely to the post-process. In Embodiment 2, as an appropriate function used for the process acting inversely to the post-process, Math. 3 and Math. 4 below are considered.

In processing of a certain hole using the drill DR1 or DR2, assume that the normalized representative deviation degree W*, the group of deviation degrees GP from the reference state A={deviation degree $U_1$ from the reference state A, deviation degree $U_2$ from the reference state A, . . . , deviation degree $U_M$ from the reference state A}, the normalized individual group of deviation degrees GP*={normalized individual deviation degree $U_1^*$, normalized individual deviation degree $U_2^*$, . . . , normalized individual deviation degree $U_M^*$} (inferior subscripts of U and U* indicate the order of the cutout section). By applying the function such as Math. 3 or Math. 4 to them, the normalized individual deviation degree $U_k^*$ of the k-th cutout section of the certain hole can be calculated. That is, $U_k^*$ calculated by Math. 3 or Math. 4 takes the normalized representative deviation degree W* by the post-process taking the largest in the normalized individual group of deviation degrees GP* corresponding to the processing of the certain hole.

Note that, in another configuration, when the post-process takes an average, functions such as Math. 5 and Math. 6 below may be used.

$$U_k^* = W^* \frac{U_k}{\max(U_1, U_2, \ldots, U_M)} \quad \text{[Math. 3]}$$

$$U_k^* = W^* \frac{U_k - \min(U_1, U_2, \ldots, U_M)}{\max(U_1, U_2, \ldots, U_M) - \min(U_1, U_2, \ldots, U_M)} \quad \text{[Math. 4]}$$

$$U_k^* = W^* \frac{U_k}{\text{ave}(U_1, U_2, \ldots, U_M)} \quad \text{[Math. 5]}$$

$$U_k^* = W^* \frac{U_k - \min(U_1, U_2, \ldots, U_M)}{\text{ave}(U_1, U_2, \ldots, U_M) - \min(U_1, U_2, \ldots, U_M)} \quad \text{[Math. 6]}$$

Then, in a label determining step S109, as an output of the training data corresponding to an input of the training data of the supervised learning machine in a k-th cutout section of a certain hole, a normalized individual deviation degree $U_k^*$ in the k-th cutout section of the certain hole is employed.

For the creation of the supervised learning machine, similar to Embodiment 1, it is only necessary to use a deep neural network, a support vector machine, or the like that can perform regression such that the normalized individual deviation degree $U_k^*$ is output according to the input of the training data, and to cause it to learn the combination of the input of the training data and the output of the training data (normalized individual deviation degree $U_k^*$) as the training data.

Thus, the output of the training data determined by the labeling methods of the above-described Embodiments 1 and 2 can give a normalizing function that outputs a common value regardless of the state estimation target in the reference state A and the reference state B to the supervised learning machine that has learned using the training data including the output determined by the methods, or the supervised learning machine having the post-process function that has learned using the training data including the output determined by the methods.

Additionally, since the output of the training data determined by the methods reflects a timing of a transition of the deviation degree from the reference state A even when the state of the state estimation target is intermediate between the reference state A and the reference state B, it can give a state estimating ability more conforming to the actual state to the supervised learning machine that has learned using the training data including the output determined by the methods, or the supervised learning machine having the post-process function that has learned using the training data including the output determined by the methods. That is, labeling of a data set more conforming to the actual state can be performed at low cost even in the intermediate state of the two reference states.

Note that, it is apparent that the supervised learning machine that has learned by the training data labeled by the disclosure is within a scope of the disclosure. However, a method for performing a learning of another supervised learning machine with the original output of the supervised learning machine or a suitably processed output as an output of the training data also uses the disclosure in a process of creating the other supervised learning machine, and the method is within the scope of the disclosure. Even when the process is repeated a finite number of times, the disclosure is used in the process and thus is within the scope of the disclosure.

Each step may be performed on a plurality of calculators or be performed on just one calculator.

The labeling method can be performed a plurality of times, thereby obtaining outputs of a plurality of training data corresponding to an input of the same training data, and further use one obtained by combining and calculating the outputs of the plurality of training data with the four arithmetic operations, functions, and the like as the label. For example, it is possible to calculate an output of the training data calculated when assuming that the reference state A is a state immediately after a start of use and the reference state B is a state where the replacement to new one is required because of the deterioration. It is also possible to calculate an output of the training data when assuming that reference state A is a state where the replacement to new one is required because of the deterioration and the reference state B is a state immediately after a start of use. Thereby, it is possible to use a difference between the outputs of the training data as the output of the training data of the supervised learning machine.

In Embodiments 1 and 2, in the deviation degree calculating step, an example of directly using the deviation degree from the reference state A calculated by the learning machine that calculates the deviation degree from the reference state A has been described. However, it is also possible to additionally create a learning machine that calculates the deviation degree from the reference state B, and regard the difference between the deviation degree from the reference state A calculated by the learning machine that calculates the deviation degree from the reference state A and the deviation degree from the reference state B calculated by the learning machine that calculates the deviation degree from the reference state B as the deviation degree from the reference state A. Thus, if the deviation degree from the reference state A can be obtained as a result, it is possible to use a plurality of the learning machines and use the respective outputs combined with the four arithmetic operations, functions, and the like, as the deviation degree from the reference state A.

In Embodiment 1 and 2, while the embodiments in which data of two state estimation targets is learned have been described, data of any given number of the state estimation targets can be learned insofar as two or more state estimation targets are learned.

It is not necessary to use all the outputs of the training data determined according to the labeling method. For example, when the drill DR1 can process 1000 holes before it needs to be replaced, and the drill DR2 can process 2000 holes before it needs to be replaced, if all the data is learned, a proportion of the drill DR2 will become larger. Therefore, for the training data of the drill DR2 (the input of the training data and the output of the training data), it is possible to learn by a probability of one half Furthermore, in Embodiments 1 and 2, the data referred to as training data of the supervised learning machine can be used not only as the training data, but also as evaluation data when evaluating a performance of the supervised learning machine. That is, if the output calculated by inputting the input of the training data to the learned supervised learning machine and the output of the training data are compared and match well, it is possible to determine that the performance of the supervised learning machine is excellent.

The output of the training data determined by the disclosure can give a normalizing function that outputs a common value regardless of the state estimation target in the reference state A and the reference state B to the supervised learning machine that has learned using the training data including the output determined by the methods, or the supervised learning machine having the post-process function that has learned using the training data including the output determined by the methods. Additionally, since the output of the training data determined by the disclosure reflects a timing of a transition of the deviation degree from the reference state A even when the state of the state estimation target is intermediate between the reference state A and the reference state B, it can give the supervised learning machine that has learned using the training data including the output determined by the methods, or the supervised learning machine having the post-process function with a state estimating ability more conforming to the actual state. That is, labeling of a data set more conforming to the actual state can be performed at low cost even in the intermediate state of the two reference states. Furthermore, when the supervised learning machine, or the supervised learning machine having the post-process function is caused to learn to output a common value regardless of the state estimation target in the reference state A and the reference state B using the training data of a considerably large number of state estimation targets with different conditions, it is expected to acquire a property (generalization ability) for outputting a common value regardless of the state estimation target in the reference state A and the reference state B even for unlearned state estimation targets with different conditions.

What is claimed is:

1. A state estimation apparatus comprising a supervised learning machine created using a method for labeling a data set of the supervised learning machine, the method determining an output of training data corresponding to an input of the training data, the training data creates the supervised learning machine used for estimating a state of a state estimation target between a case where the state estimation target is in a predetermined reference state A and a case where the state estimation target is in a predetermined reference state B different from the reference state A, the method comprising:

determining data, which is selected from a first physical quantity obtained in a case where the state estimation target is in a predetermined state and data obtained based on the first physical quantity that are related to the state of the state estimation target, as the input of the training data;

referring data, which is selected from a second physical quantity obtained in a case where the state of the state estimation target is identical to a state in the case where the first physical quantity relating to the input of the training data is obtained and data obtained based on the second physical quantity that are related to the state of the state estimation target, as corresponding data;

calculating, for the two or more state estimation targets, a deviation degree from the reference state A for each of a plurality of the corresponding data including at least corresponding data when each of the state estimation targets is in the reference state A and corresponding data when each of the state estimation targets is in the reference state B;

setting a map for each of the state estimation targets, as the map for plotting each of the deviation degrees from the reference state A of the plurality of the corresponding data on a normalized deviation degree, the map being allowed to map the deviation degree from the reference state A in the reference state A on a specified value to be output by the supervised learning machine in the reference state A, the map being allowed to map the deviation degree from the reference state A in the reference state B on a specified value to be output by the supervised learning machine in the reference state B, the map being a monotonic map in a section between the deviation degree from the reference state A in the reference state A and the deviation degree from the reference state A in the reference state B;

calculating the normalized deviation degree by mapping an image of the deviation degree from the reference state A for each of the plurality of corresponding data using the map; and determining the normalized deviation degree as the output of the training data corresponding to the input of the training data, wherein the deviation degree from reference state A is calculated by an unsupervised learning machine, wherein the deviation degree is calculated by the unsupervised learning machine and then the supervised learning machine is created using the input of the training data and the normalized deviation degree, and wherein the state estimation apparatus is configured to display a warning or notification to an administrator indicating that the state estimation target needs to be replaced with a new state estimating target when a predetermined threshold between when the state estimation target is in the reference state A and the reference state B is exceeded.

2. The method for labeling a data set of a supervised learning machine according to claim 1, wherein the state of the state estimation target transitions in one direction from one of the reference state A or the reference state B to another in chronological order, the method comprises:

calculating, for each of the state estimation targets, the deviation degree from the reference state A of each of the plurality of corresponding data, and subsequently performing a filter processing in a state where the calculated deviation degrees from the reference state A are arranged in chronological order to convert the calculated deviation degrees from the reference state A into smooth deviation degrees from the reference state A; and using the smooth deviation degree from the reference state A instead of the deviation degree from the reference state A in the setting of the map for mapping the deviation degree from the reference state A of each of the plurality of corresponding data on the normalized deviation degree and in the calculation of the normalized deviation degree.

3. A state estimation apparatus comprising a supervised leaning machine created using a method for labeling a data set of the supervised learning machine, the method determining an output of training data corresponding to an input of the training data, the training data creates the supervised learning machine used for estimating a state of a state estimation target between a case where the state estimation target is in a predetermined reference state A and a case where the state estimation target is in a predetermined reference state B different from the reference state A, wherein the supervised learning machine has a function of performing a post-process that calculates a representative value of an output group as a set of outputs calculated from respective inputs when a plurality of predetermined data belonging to a data group as a set of a plurality of data are inputted, and the method comprises:

determining data, which is selected from a first physical quantity obtained in a case where the state estimation target is in a predetermined state and data obtained based on the first physical quantity that are related to the state of the state estimation target, as the input of the training data;

referring data, which is selected from a second physical quantity obtained in a case where the state of the state estimation target is identical to a state in the case where the first physical quantity relating to the input of the training data is obtained and data obtained based on the second physical quantity that are related to the state of the state estimation target, as corresponding data;

calculating, for the two or more state estimation targets, deviation degrees from the reference state A of the corresponding data belonging to a respective plurality of corresponding data group for the respective plurality of corresponding data groups, the corresponding data groups each including at least a first corresponding data group and a second corresponding data group, the first corresponding data group including a plurality of corresponding data when each of the state estimation targets is in the reference state A, and the second corresponding data group including a plurality of the corresponding data when each of the state estimation targets is in the reference state B;

determining respective sets of the deviation degrees from the reference state A corresponding to the plurality of corresponding data groups to which the corresponding data corresponding to the respective calculated deviation degrees from the reference state A belong as groups of deviation degrees from the reference state A;

applying the post-process executed by the supervised learning machine to each of the plurality of groups of deviation degrees from the reference state A to calculate a representative deviation degree from the reference state A in each of the plurality of groups of deviation degrees from the reference state A;

setting a map for each of the state estimation targets, as the map for plotting each of the representative deviation degrees from the reference state A corresponding to the plurality of corresponding data groups on a normalized representative deviation degree, the map being allowed to map the representative deviation degree from the reference state A in the reference state A on a specified value to be taken by a representative value calculated by the supervised learning machine in the reference state A, the map being allowed to map the representative deviation degree from the reference state A in the reference state B on a specified value to be taken by a representative value calculated by the supervised learning machine in the reference state B, the map being a monotonic map in a section between the representative deviation degree from the reference state A in the reference state A and the representative deviation degree from the reference state A in the reference state B;

calculating the normalized representative deviation degree by mapping an image of the representative deviation degree from the reference state A for each of the plurality of the corresponding data groups using the map;

performing a process that is inverse to the post-process to each of a plurality of the normalized representative deviation degrees and to each of the groups of deviation degrees from the reference state A corresponding to the respective plurality of normalized representative deviation degrees to calculate a normalized individual deviation degree for each of the plurality of corresponding data groups corresponding to the plurality of normalized representative deviation degrees, the normalized representative deviation degree being calculated from the normalized individual deviation degree once the post-process has been performed; and determining the normalized individual deviation degree as the output of the training data corresponding to the input of the training data, wherein the deviation degree from reference state A is calculated by an unsupervised learning machine, wherein the deviation degree is calculated by the unsupervised learning machine and then the supervised learning machine is created using the input of the training data and the normalized deviation degree, and wherein the state estimation apparatus is configured to display a warning or notification to an administrator indicating that the state estimation target needs to be replaced with a new state estimation target when a predetermined threshold between when the state estimation target is in the reference state A and the reference state B is exceeded.

4. The method for labeling a data set of a supervised learning machine according to claim 3, wherein the state of the state estimation target transitions in one direction from one of the reference state A or the reference state B to another in chronological order, the method comprises:

calculating, for each of the plurality of state estimation targets, the representative deviation degree from the reference state A of each of the plurality of corresponding data groups, and subsequently performing a filter processing in a state where the calculated representative deviation degrees from the reference state A are arranged in chronological order to convert the calculated representative deviation degrees from the reference state A into smooth representative deviation degrees from the reference state A; and using the smooth representative deviation degree from the reference state A instead of the representative deviation degree from the reference state A in the setting of the map for mapping the representative deviation degree from the reference state A of each of the plurality of corresponding data groups on the normalized representative deviation degree and in the calculation of the normalized representative deviation degree.

5. The state estimation apparatus according to claim 1, wherein the state estimation apparatus is configured to simultaneously display an output of the supervised learning machine, a specified value to be output by the supervised learning machine when the state estimation target is in the reference state A, and a specified value to be output by the supervised learning machine when the state estimation target is in the reference state B, as numerical values or in a graph.

6. The state estimation apparatus according to claim 3, wherein the state estimation apparatus is configured to simultaneously display a representative value of the output group output by the supervised learning machine, a specified value to be taken by the representative value calculated by the supervised learning machine when the state estimation target is in the reference state A, and a specified value to be taken by the representative value calculated by the supervised learning machine when the state estimation target is in the reference state B, as numerical values or in a graph.

7. The state estimation apparatus according to claim 2, wherein the state estimation apparatus is configured to simultaneously display an output of the supervised learning machine, a specified value to be output by the supervised learning machine when the state estimation target is in the reference state A, and a specified value to be output by the supervised learning machine when the state estimation target is in the reference state B, as numerical values or in a graph.

8. The state estimation apparatus according to claim 4, wherein the state estimation apparatus is configured to simultaneously display a representative value of the output group output by the supervised learning machine, a specified value to be taken by the representative value calculated by the supervised learning machine when the state estimation target is in the reference state A, and a specified value to be taken by the representative value calculated by the supervised learning machine when the state estimation target is in the reference state B, as numerical values or in a graph.

* * * * *